US012175843B2

(12) United States Patent
Trapani et al.

(10) Patent No.: US 12,175,843 B2
(45) **Date of Patent: *Dec. 24, 2024**

(54) SMART SENSOR DEVICE AND EARLY WARNING NOTIFICATION SYSTEM AND METHOD

(71) Applicant: Security Enhancement Systems, LLC, Northbrook, IL (US)

(72) Inventors: Matthew Frank Trapani, Deerfield, IL (US); Philip J. Ufkes, Sullivan's Island, SC (US); Steven J. Malone, Mt. Pleasant, SC (US); David Schmidt, Northbrook, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,333

(22) Filed: Sep. 29, 2023

(65) Prior Publication Data

US 2024/0105035 A1 Mar. 28, 2024

Related U.S. Application Data

(63) Continuation of application No. 17/710,865, filed on Mar. 31, 2022, now Pat. No. 11,810,434.

(Continued)

(51) Int. Cl.
*G08B 13/16* (2006.01)

(52) U.S. Cl.
CPC ................................ *G08B 13/1609* (2013.01)

(58) Field of Classification Search
CPC ................................................. G08B 13/1609
See application file for complete search history.

(56) References Cited

U.S. PATENT DOCUMENTS 11,810,434 B2 * 11/2023 Trapani .............. G08B 13/1609
2003/0020610 A1 * 1/2003 Swanson .............. G08B 13/122 340/567
2021/0201636 A1 * 7/2021 Amir ...................... G08B 29/26

FOREIGN PATENT DOCUMENTS

KR 101459372 B1 * 11/2014

OTHER PUBLICATIONS

Examination Report, Canadian application No. 3,215,870. Date of mailing: Nov. 3, 2023. Canadian Intellectual Property Office. Gatineau, CA.

* cited by examiner

*Primary Examiner* — Curtis A Kuntz
*Assistant Examiner* — James E Munion
(74) *Attorney, Agent, or Firm* — Gregory Finch; Finch Paolino, LLC

(57) ABSTRACT

A smart sensor early warning notification system. Certain aspects of the present disclosure provide for a smart sensor early warning notification system comprising a smart sensor coupled to a door and configured to detect one or more unauthorized access events, including sawing, blunt force and other atypical vibrations to the door. A smart sensor may be communicably engaged with a local alarm to communicate sensor data received at the smart sensor. The local alarm may be configured to process the sensor data received from the smart sensor and trigger an alarm event and/or notification or pre-event detection alert in response to the sensor data. A door controller may be configured to send different pulses or messages to indicate the type of alarm event to an alarm management server and/or access control servers via public/private cloud.

20 Claims, 5 Drawing Sheets

Related U.S. Application Data

(60) Provisional application No. 63/172,184, filed on Apr. 8, 2021, provisional application No. 63/168,559, filed on Mar. 31, 2021.

SMART SENSOR DEVICE AND EARLY WARNING NOTIFICATION SYSTEM AND METHOD

CROSS-REFERENCE TO RELATED APPLICATIONS

The present application is a continuation of U.S. patent application Ser. No. 17/710,865, filed on Mar. 31, 2022, and entitled "SMART SENSOR DEVICE AND EARLY WARNING NOTIFICATION SYSTEM AND METHOD," which claims the benefit of U.S. Provisional Application Ser. No. 63/168,559, filed on Mar. 31, 2021, and entitled "SMART SENSOR DEVICE AND EARLY WARNING NOTIFICATION SYSTEM"; and also claims the benefit of U.S. Provisional Application Ser. No. 63/172,184, filed on Apr. 8, 2021, and entitled "SMART SENSOR DEVICE AND EARLY WARNING NOTIFICATION SYSTEM"; the disclosures of which are hereby incorporated in their entireties at least by virtue of this reference.

FIELD

The present disclosure relates to the field of electronic locking devices and electronic access control systems; in particular, a smart sensor device and early warning notification system for use in electronic access control systems.

BACKGROUND

Electronic access control (EAC) systems use computers and other electrical components to solve the limitations of mechanical locks and keys. A wide range of credentials can be used to replace mechanical keys. The electronic access control system grants access based on the credential presented. When access is granted, the door is unlocked for a predetermined time and the transaction is recorded. When access is refused, the door remains locked, and the attempted access is recorded. The system will also monitor the door and alarm if the door is forced open or held open for too long of a period after being unlocked. While EAC systems are designed to secure access points and alert one or more users of unauthorized access to an access point, many EAC systems fail to incorporate meaningful solutions for detecting and alerting one or more users to an attempted breach, tamper event or other unauthorized access attempt for a secured access point.

Through applied effort, ingenuity, and innovation, Applicant has identified a number of deficiencies and problems with early warning detection and notification systems in electronic access control systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a smart sensor early warning notification system comprising a smart sensor coupled to a door and configured to detect one or more unauthorized access events, including sawing, blunt force and other atypical vibrations to a door. A smart sensor may be communicably engaged with a local alarm to communicate sensor data received at the smart sensor. The local alarm may be configured to process the sensor data received from the smart sensor and trigger an alarm event and/or notification or pre-event detection alert in response to the sensor data. A door controller may be configured to send different pulses or messages to indicate the type of alarm event to an alarm management server and/or access control servers via public/private cloud.

Further aspects of the present disclosure provide for a smart sensor early warning notification system, comprising a smart sensor coupled to a door, the smart sensor being configured to detect one or more atypical vibrations comprising sawing, blunt force and drilling; a local alarm communicably engaged with the smart sensor to receive sensor data from the smart sensor, wherein the local alarm is configured to process the sensor data received from the smart sensor and trigger an alarm event and/or notification or pre-event detection alert in response to the sensor data.

Further aspects of the present disclosure provide for an electronic access control system, comprising a vibration sensor operably installed at an access point of an enclosure, wherein the vibration sensor is configured to detect one or more vibrations at the access point of the enclosure; and an electronic access controller communicably engaged with the vibration sensor, the electronic access controller comprising at least one processor and a non-transitory computer-readable medium having instructions stored thereon that, when executed by the at least one processor, cause the at least one processor to perform one or more operations, the one or more operations comprising receiving a sensor input from the vibration sensor in response to the vibration sensor detecting one or more vibrations at the access point of the enclosure; processing the sensor input to determine whether the one or more vibrations exceed a predetermined vibration threshold; in response to determining the one or more vibrations exceed the predetermined vibration threshold, communicating a notification to at least one alarm system communicably engaged with the electronic access controller.

Still further aspects of the present disclosure provide for an electronic access control system, comprising an electronic access control device configured to selectively secure an access point of an enclosure, wherein the access point comprises a door; a vibration sensor operably installed at the access point of the enclosure, wherein the vibration sensor is configured to detect one or more vibrations at the access point of the enclosure; and an electronic access controller communicably engaged with the vibration sensor and the electronic access control device; and an alarm system communicably engaged with the electronic access controller; wherein the electronic access controller comprises at least one processor and a non-transitory computer-readable medium having instructions stored thereon that, when executed by the at least one processor, cause the at least one processor to perform one or more operations, the one or more operations comprising receiving an access request for the electronic access control device from at least one user; suppressing an alarm of the alarm system in response to authorizing the access request; actuating the electronic access control device to grant access to the access point of the enclosure; receiving an input from the vibration sensor in response to the at least one user accessing the access point of the enclosure; securing the electronic access control device in response to receiving the input from the vibration sensor; and reengaging the alarm of the alarm system in response to securing the electronic access control device.

Still further aspects of the present disclosure provide for an electronic access control method, comprising receiving, with an electronic access controller, a sensor input from a vibration sensor in response to the vibration sensor detecting one or more vibrations at an access point of an enclosure; processing, with the electronic access controller, the sensor input to determine whether the one or more vibrations exceed a predetermined vibration threshold; and in response to determining the one or more vibrations exceed the predetermined vibration threshold, communicating, with the electronic access controller, a notification to at least one alarm system communicably engaged with the electronic access controller.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
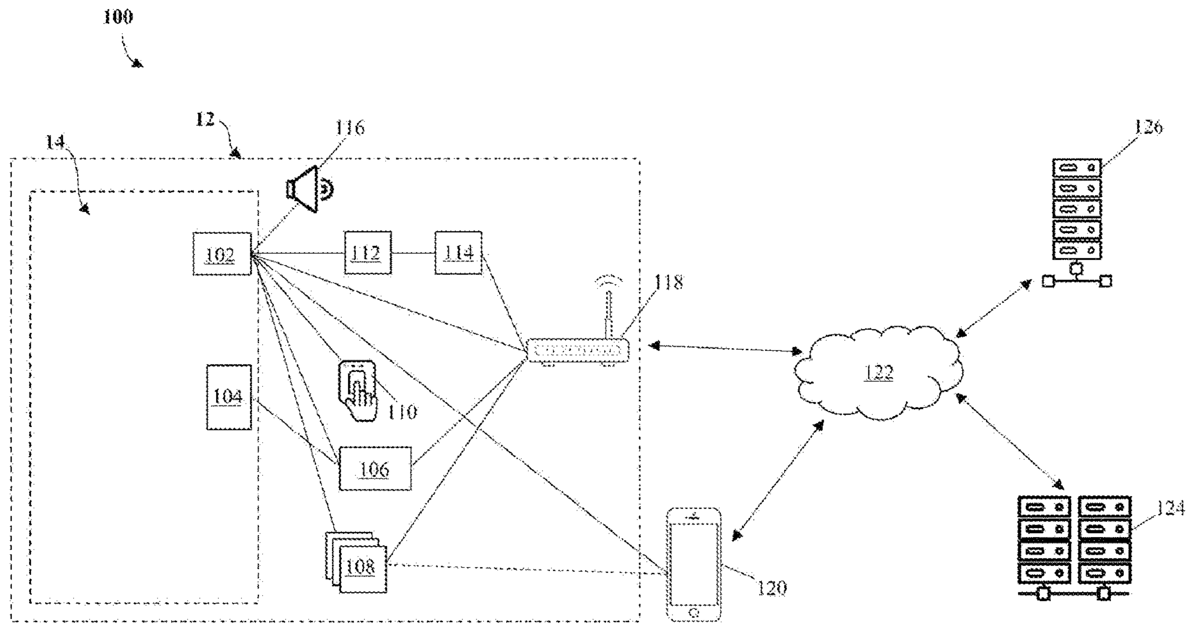
FIG. 1 is a system diagram of an electronic security notification system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for an integrated electronic locking system and electronic locking device configured to enable electronic access control of an integrated electronic locking device via multiple electronic access modalities across multiple user types. An integrated electronic locking system of the present disclosure may be configured to enable a system administrator to configure different access control parameters for two or more different access control modalities/types across two or more different users and/or use cases. In accordance with certain embodiments, an integrated electronic locking system comprises an integrated electronic locking device communicably engaged with a remote server over a wireless or wireline communications interface to enable one or more operations of an integrated electronic access control method.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

Turning now descriptively to the drawings, in which similar reference characters denote similar elements throughout the several views, FIG. 1 depicts a system diagram of a smart sensor early warning notification system 100. In accordance with certain aspects of the present disclosure, system 100 comprises a smart sensor 102 coupled to a door 14 and configured to detect environmental disturbances associated with one or more unauthorized access events, including sawing, blunt force and other atypical vibrations to door 14. In accordance with certain embodiments, door 14 may comprise a door, panel and other access point for access controlled and/or remote sites such as in the telecommunications, energy and transportation industries. These types of sites may comprise a plurality of enclosures such as shelters, cabinets, poles, vehicles, and other indoor and outdoor enclosures in remote locations. In accordance with certain aspects of the present disclosure, door 14 is configured to secure an access point of a secured location 12. In accordance with certain aspects of the present disclosure, smart sensor 102 is configured to detect when an unauthorized person attempts to breach door 14 by using tools and other means that create vibrations on door 14. In certain embodiments, smart sensor 102 is configured to detect a variance of vibrations and may be configured to distinguish between a "typical" vibration and an "atypical" vibration. In accordance with certain embodiments, system 100 may comprise a sensor suite 108 configured to detect one or more environmental inputs including temperature, presence of water and humidity, black and brown power outages and the like. In accordance with certain embodiments, sensor suite 108 may include one or more sensor types, including accelerometers, Hall-effect sensors, inductive sensors, humidity sensors, ambient light sensors, temperature sensors, and power outage sensors and the like.

In accordance with certain aspects of the present disclosure, smart sensor 102 may be communicably engaged with an audible local alarm 116 to communicate sensor data received at smart sensor 102. Audible local alarm 116 may be configured to process the sensor data received from smart sensor 102 and trigger an alarm event and/or notification or pre-event detection alert in response to the sensor data. When an alarm event is triggered (e.g., beyond a predetermined threshold of an unwanted event), a door controller 106 may be configured to communicate the alarm event status using existing sensor switches (e.g., existing door switch sensor 114 and/or receiver/reed relay switch 112) so that the cost and ease to deploy smart sensor 102 is scalable. Smart sensor 102 and/or door controller 106 may be communicably engaged with a wireless or wireline communications interface, such as BLUETOOTH Low Energy (BLE), WiFi, ethernet, LORA, cellular and the like. Smart sensor 102 and/or door controller 106 may comprise a simple voltage wire, battery and/or line powered. Door controller 106 may be configured to send different pulses or messages to indicate the type of alarm event to alarm management server 126 and/or access control servers 124 via public/private cloud 122.

In accordance with certain aspects of the present disclosure, sensor suite 108 may be configured to communicate with each other via a mesh or other protocols for further efficiencies in deployment. In accordance with certain embodiments, system 100 comprises a lock 104 operably engaged with door 14. System 100 may further comprise a mobile electronic device 120 (e.g., a client device such as a smart phone or tablet computer) that is communicably engaged with one or more of smart sensor 102, door controller 106 and sensor suite 108 via a wireless communications interface (e.g., BLUETOOTH). Mobile electronic device 120 may be further communicably engaged with private/public cloud 122 via a network interface (e.g., Internet connection). Private/public cloud 122 may be communicably engaged with alarm management server 126 and access control servers 124 via the network interface. In accordance with certain embodiments, a BLE/Ethernet/Analog line router 118 is operably engaged with an existing door switch sensor 114.

In accordance with certain aspects of the present disclosure, system 100 is operably configured to integrate alarm events with an access control system to enable a system user to become notified of a site breach before unauthorized personnel can enter the site (e.g., before the breach occurs). In accordance with certain embodiments, system 100 comprises one or more operations or system routines to provide a smart sensor early warning notification system, as follows:

1. User gets authorized by access control system
2. Alarm is suppressed by the access control system
3. Vibration occurs, door is unlocked from a door controlling device and door is opened
4. User enters site and performs work
5. User secures site
6. Alarm is re-engaged In accordance with certain aspects of the present disclosure, system 100 is operably configured such that if smart sensor 102 senses vibration out of sequence (i.e., an atypical vibration), smart sensor 102 is configured to provide an input to local audible alarm 116 and also optionally use receiver/reed relay switch 112 and/or existing door switch sensor 114 to transmit alarm notifications and types of notification by a single pulse or multiple pulses based on the type of event that was sensed.

In accordance with certain embodiments, smart sensor 102 can also use a BLE/Ethernet/Analog Line Router, Mobile Device via Cellular/BLE/WIFI and a public/private cloud and other network to interface with the alarm management and access control servers.

In accordance with certain embodiments, sensor suite 108 may further comprise one or more audio and video sensors, such as acoustic transducer, microphones, digital cameras, optical sensors, thermal/acoustic cameras and the like. The one or more audio and video sensors may be operably engaged with smart sensor 102, door controller 106 and audible local alarm 116 to enable integrated audio/video site surveillance combined with environmental sensing capabilities to enable an early warning breach detection system. In certain embodiments, system 100 may further comprise one or more biometric authentication device 110 communicably engaged with smart sensor 102 and door controller 106 to authenticate an authorized user of system 100 and grant access to lock 104. In accordance with certain embodiments, different levels of biometric authentication may be associated with different degrees of security and/or different access permissions. For example, a first user role may comprise a biometric identification comprising a fingerprint scan and a second user role may comprise a combination of a fingerprint scan and a facial recognition. In accordance with various embodiments, biometric authentication device 110 may comprise one or more of fingerprint recognition, facial recognition, voice recognition, iris recognition, retina scan, keystroke dynamics, signature recognition and combinations thereof and the like. In accordance with certain embodiments, door controller 106 may be configured to perform one or more routines or operations for receiving a biometric user input and performing a biometric identification of a user. In accordance with various embodiments, one or more routines for performing a biometric identification of a user may comprise one or more operations for receiving a biometric user input from biometric authentication device 110 and processing the biometric user input to perform fingerprint recognition, facial recognition, voice recognition, iris recognition, retina scan, keystroke dynamics, signature recognition and combinations thereof and the like.

Figure 2:
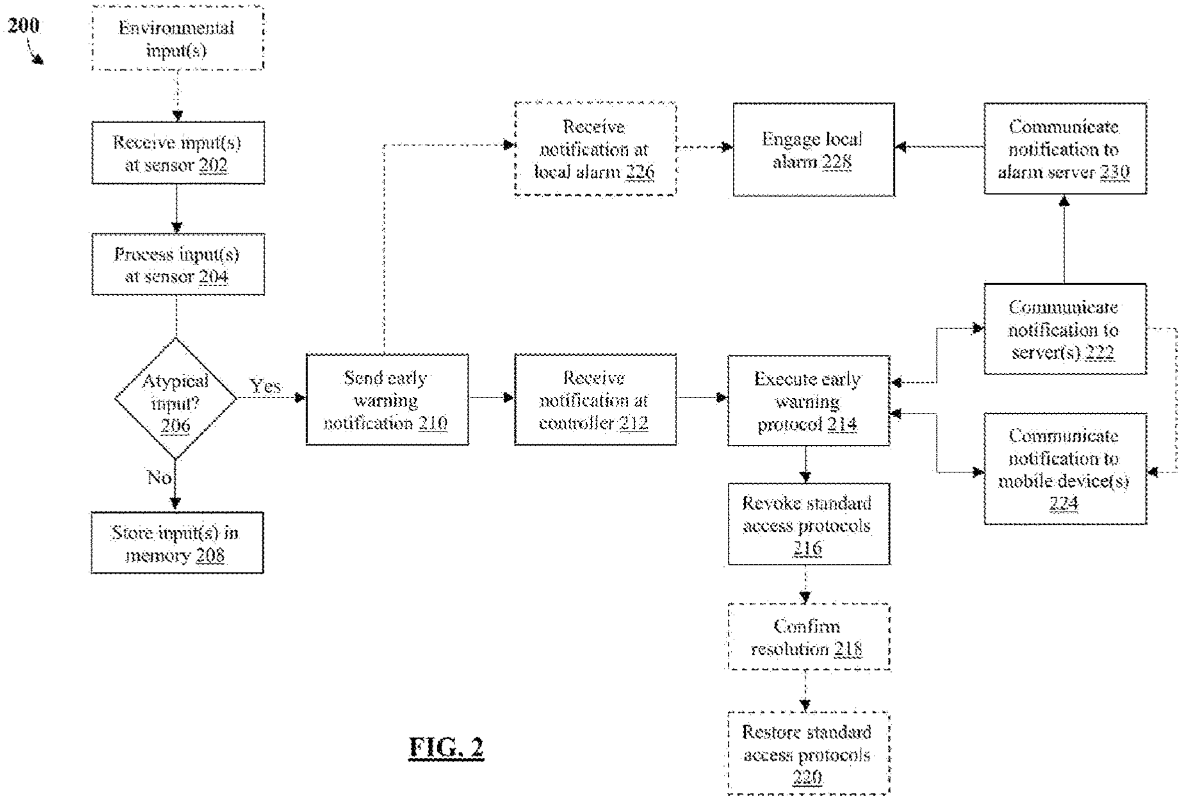
FIG. 2 is a functional block diagram of an electronic security notification system, in accordance with certain aspects of the present disclosure.

Referring now to FIG. 2, with cross reference to FIG. 1, a functional block diagram of a routine 200 of an electronic security notification system is shown. In accordance with certain aspects of the present disclosure, routine 200 may be executed across/within one or more system components of system 100 of FIG. 1. In accordance with certain aspects of the present disclosure, routine 200 may comprise one or more steps or operations for receiving an environmental sensor input (e.g., a vibration input) to determine whether the sensor input is atypical or exceeds a predetermined threshold in order to send an early warning notification to one or more communicably engaged system components (e.g., a server or mobile device) and/or initiate one or more early warning protocol.

In accordance with certain aspects of the present disclosure, routine 200 may be initiated upon receiving, at a sensor device (e.g., smart sensor 102 of FIG. 1) one or more environmental inputs at a door or access point of a secured location or enclosure (Block 202). In accordance with certain aspects of the present disclosure, the one or more environmental inputs may comprise one or more vibrations at the door or access point of the secured location or enclosure. In accordance with certain aspects of the present disclosure, the one or more environmental inputs may comprise one or more temperature, humidity, power outages or fluctuations or other environmental events. In accordance with certain embodiments, routine 200 may comprise one or more steps or operations for processing the one or more environmental inputs at the sensor device (Block 204). Routine 200 may comprise one or more data processing steps or operations for determining whether the one or more environmental inputs comprise an atypical input (Block 206). In accordance with certain aspects of the present disclosure, an atypical input may comprise a vibration input that exceeds a predetermined vibration threshold (e.g., a vibration level indicative of blunt force trauma). Another example of an atypical input may include an input that comprises certain vibrational characteristics (e.g., an input that is indicative of sawing or grinding at the door or access point). Another example of an atypical input may comprise an input that is out of the ordinary based on historical input data (e.g., a rapid change in temperature or humidity, a vibration that is different in some way from normal vibration associated with opening/closing the door, a sudden power outage or power fluctuation and the like). In accordance with certain aspects of the present disclosure, if an output of step 206 is NO, the input is not atypical (i.e., it does not exceed a static or dynamic threshold), then routine 200 may continue by executing one or more steps or operations for storing the input data in memory and/or updating one or more input threshold parameters or values (Block 208). If an output of step 206 is YES, the input is atypical (i.e., the input does exceed a static or dynamic threshold), then routine 200 may continue by executing one or more steps or operations for sending an early warning notification to a door controller and optionally a local alarm (Block 210). In accordance with certain embodiments, the door controller may comprise door controller 106 of FIG. 1. In certain embodiments, the local alarm may comprise local alarm 116 of FIG. 1. In certain embodiments, routine 200 may comprise one or more steps or operations for receiving the early warning notification (e.g., signal) at the local alarm (Block 226) and engaging a local alarm (Block 228). In accordance with certain embodiments, the local alarm may comprise an audible alarm or a silent alarm.

In accordance with certain aspects of the present disclosure, routine 200 may comprise one or more steps or operations for receiving the early warning notification at the door controller (Block 212). In certain embodiments, routine 200 may comprise one or more steps or operations for executing (e.g., via the door controller) an early warning protocol in response to receiving the early warning notification (Block 214). In accordance with certain embodiments, routine 200 may comprise one or more steps or operations for revoking (e.g., at the door controller) one or more standard access protocols for a door lock or electronic access control device for the door (Block 216). In certain embodiments the door lock may comprise lock 104 of FIG. 1 and the door may comprise door 14 of FIG. 1. In certain embodiments, step 216 may comprise one or more operations for blocking or revoking one or more user or device access rights or credentials. In accordance with certain aspects of the present disclosure, the early warning protocol (Block 214) may comprise one or more steps or operations for communicating an early warning notification to one or more EAC server (e.g., access control servers 124 of FIG. 1) (Block 222) and/or one or more client device or mobile electronic device (e.g., mobile electronic device 120 of FIG. 1) (Block 224) and/or one or more alarm system server (e.g., alarm management server 126 of FIG. 1) (Block 230). In accordance with certain aspects of the present disclosure, routine 200 may comprise one or more steps or operations for receiving one or more communications from the one or more EAC server and/or the one or more client device or mobile electronic device. Routine 200 may comprise one or more steps or operations for determining/confirming a resolution for the early warning event (e.g., in response to an input/communication from the one or more EAC server and/or the one or more client device or mobile electronic device) (Block 218) and restoring one or more standard access protocols for the system (Block 220).

Figure 3:
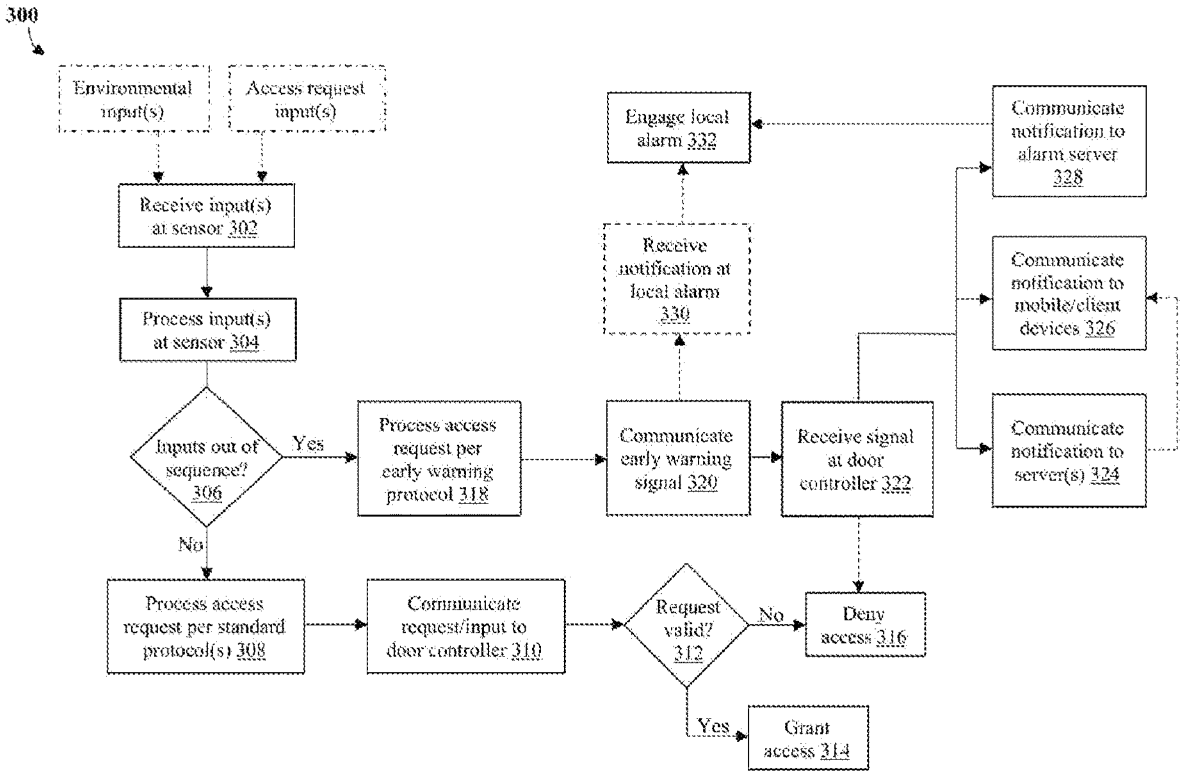
FIG. 3 is a functional block diagram of an electronic security notification system, in accordance with certain aspects of the present disclosure.

Referring now to FIG. 3, with cross reference to FIG. 1, a functional block diagram of a routine 300 of an electronic security notification system is shown. In accordance with certain aspects of the present disclosure, routine 300 may be executed across/within one or more system components of system 100 of FIG. 1. In accordance with certain aspects of the present disclosure, routine 300 may comprise one or more steps or operations for receiving one or more environmental sensor inputs and processing the inputs to determine whether the inputs are out of sequence with one or more access request inputs in order to provide an early warning notification or initiate an early warning response protocol.

In accordance with certain aspects of the present disclosure, routine 300 may be initiated upon receiving one or more environmental inputs and one or more access request inputs at a smart sensor device (e.g., smart sensor 102 of FIG. 1) (Block 302). In accordance with certain aspects of the present disclosure, the one or more environmental inputs may comprise one or more vibrations at the door or access point of the secured location or enclosure. In accordance with certain aspects of the present disclosure, the one or more environmental inputs may comprise one or more temperature, humidity, power outages or fluctuations or other environmental events. In accordance with certain aspects of the present disclosure, the access request inputs may comprise one or more user credentials and/or access codes for actuating an electronic access control device (e.g., lock 104 of FIG. 1). In certain embodiments, the access request inputs may be received at an electronic access controller (e.g., door controller 106) and communicated to the smart sensor device. In accordance with certain aspects of the present disclosure, routine 300 may proceed by executing one or more steps or operations for processing the environmental inputs and the access request inputs (Block 304) to determine whether the inputs are out of sequence with a specified sequence for accessing the electronic access control device (Block 306). In accordance with certain embodiments, a specified sequence for accessing the electronic access control device may comprise: 1. User authorized by access control system; 2. Alarm is suppressed by the access control system; 3. Vibration occurs, door is unlocked from a door controlling device and door is opened; 4. User enters site and performs work; 5. User secures site; 6. Alarm is re-engaged. In accordance with certain aspects of the present disclosure, if the output of step 306 is NO, the inputs are not out of sequence, then routine 300 proceeds by executing one or more steps or operations for processing the access request according to standard access control protocol(s) (Block 308). Routine 300 may proceed by communicating the access request (i.e., input) to the door controller (Block 310) to determine whether the access request is valid (Block 312). If YES, the door controller may grant access to the door lock (Block 314). If NO, the door controller may deny access to the door lock (Block 316). In accordance with certain aspects of the present disclosure, if the output of step 306 is YES, the inputs are out of sequence, then routine 300 proceeds by executing one or more steps or operations for processing the access request according to an early warning security protocol(s) (Block 318). In certain embodiments, an early warning security protocol, comprising one or more steps or operations of routine 300, may comprise communicating an early warning signal to the door controller and/or the local alarm (Block 320). Routine 300 may comprise one or more steps or operations for receiving the early warning signal at the local alarm (Block 330) and engaging the local alarm (Block 332). Routine 300 may comprise one or more steps or operations for receiving the early warning signal at the door controller (Step 322) and denying the access request (Block 316) in response to receiving the early warning signal from the sensor device. In accordance with certain aspects of the present disclosure, routine 300 may comprising one or more steps or operations for communicating an early warning notification to one or more electronic access management server(s) (Block 324), mobile computing devices and/or client devices (Block 326) and/or alarm server (Block 328).

Figure 4:
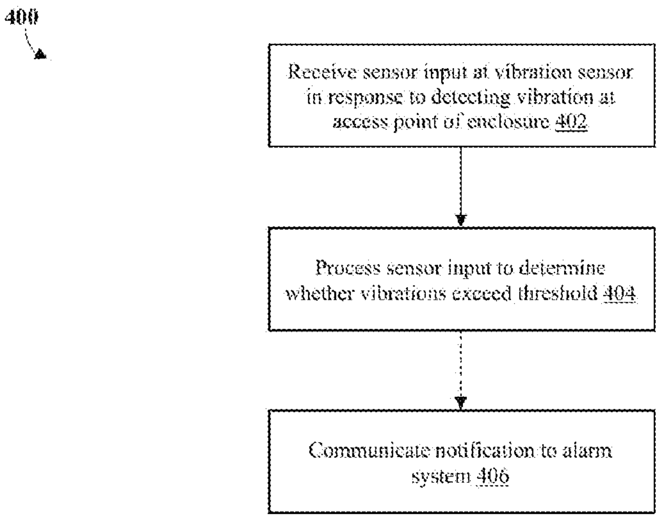
FIG. 4 is a process flow diagram of an electronic security notification method, in accordance with certain aspects of the present disclosure.

Referring now to FIG. 4, with cross reference to FIG. 1, a process flow diagram of an electronic security notification method 400 is shown. In accordance with certain aspects of the present disclosure, method 400 may be embodied within one or more system components of system 100 of FIG. 1. In accordance with certain aspects of the present disclosure, method 400 may be embodied within one or more steps or operations of routines 200 and/or 300 of FIGS. 2-3. In accordance with certain aspects of the present disclosure, method 400 may be initiated by performing one or more steps or operations for receiving a sensor input from the vibration sensor (e.g., smart sensor 102 of FIG. 1) in response to the vibration sensor detecting one or more vibrations at an access point of an enclosure (e.g., door 14 of FIG. 1) (Step 402). In certain embodiments, the vibration sensor may comprise one or more sensor from sensor suite 108 of FIG. 1. In accordance with certain aspects of the present disclosure, method 400 may proceed by executing one or more steps or operations for processing the sensor input to determine whether the one or more vibrations exceed a predetermined vibration threshold (Step 404). In accordance with certain aspects of the present disclosure, method 400 may proceed by executing one or more steps or operations for communicating a notification to at least one alarm system communicably engaged with an electronic access controller (e.g., controller 106 of FIG. 1) in response to determining the one or more vibrations exceed the predetermined vibration threshold (Step 406).

In accordance with certain aspects of the present disclosure, method 400 may further comprise one or more steps or operations for processing the sensor input to determine a variance in the one or more vibrations based on one or more previous sensor inputs. In certain embodiments, the vibration sensor may be communicably engaged with the electronic access controller via a wireless communications interface. In accordance with certain aspects of the present disclosure, method 400 may further comprise one or more steps or operations for communicating a warning notification to at least one remote server in response to determining the one or more vibrations exceed the predetermined vibration threshold.

Figure 5:
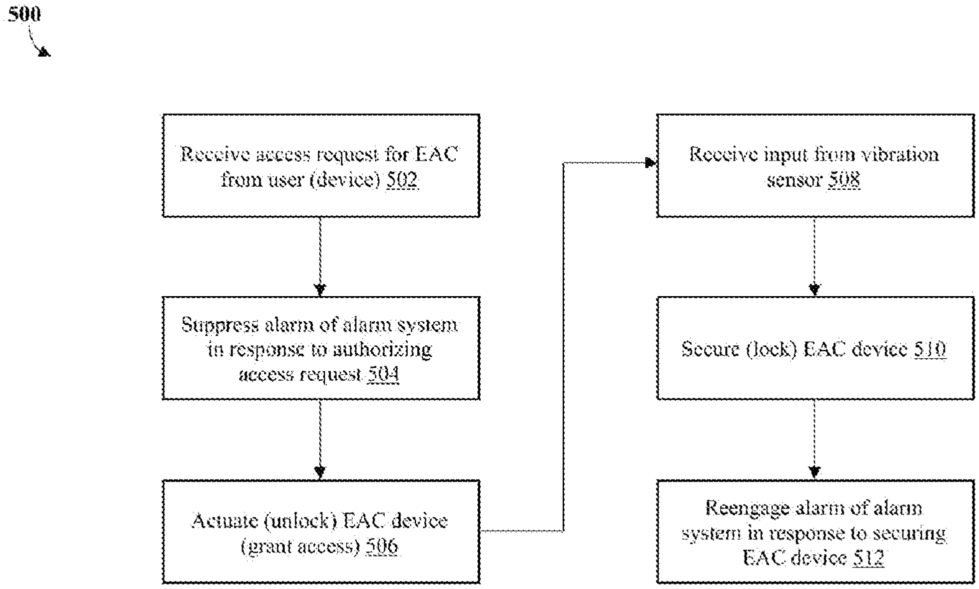
FIG. 5 is a process flow diagram of an electronic security notification method, in accordance with certain aspects of the present disclosure.

Referring now to FIG. 5, with cross reference to FIG. 1, a process flow diagram of an electronic security notification method 500 is shown. In accordance with certain aspects of the present disclosure, method 500 may be embodied within one or more system components of system 100 of FIG. 1. In accordance with certain aspects of the present disclosure, method 500 may be embodied within one or more steps or operations of routines 200 and/or 300 of FIGS. 2-3. Method 500 may be successive or sequential to one or more steps of method 400 of FIG. 4. In accordance with certain aspects of the present disclosure, method 500 may be initiated upon performing one or more steps or operations for receiving an access request for accessing an electronic access control device (e.g., door lock 104 of FIG. 1) from at least one user (Step 502). The electronic access control device may be configured to selectively secure an access point of an enclosure (e.g., door 14 of FIG. 1). Method 500 may proceed by executing one or more steps or operations for suppressing an alarm of an alarm system in response to authorizing the access request (Step 504). Method 500 may proceed by executing one or more steps or operations for actuating the electronic access control device to grant access to the access point of the enclosure (Step 506). Method 500 may proceed by executing one or more steps or operations for receiving an input from the vibration sensor in response to the at least one user accessing the access point of the enclosure (Step 508). Method 500 may proceed by executing one or more steps or operations for securing the electronic access control device in response to receiving the input from the vibration sensor (Step 510). In accordance with certain aspects of the present disclosure, method 500 may proceed by executing one or more steps or operations for reengaging the alarm of the alarm system in response to securing the electronic access control device (Step 512).

In accordance with certain aspects of the present disclosure, method 500 may further comprise one or more steps or operations for processing an input from the vibration sensor to determine whether the input from the vibration sensor is out of sequence with one or more operations of the electronic access controller. Method 500 may further comprise one or more steps or operations for engaging the alarm of the alarm system in response to determining the input from the vibration sensor is out of sequence. Method 500 may further comprise one or more steps or operations for communicating a warning notification to at least one remote server in response to determining the input from the vibration sensor is out of sequence. Method 500 may further comprise one or more steps or operations for processing the input from the vibration sensor to determine whether the one or more vibrations exceed a predetermined vibration threshold.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. An early warning access detection system comprising:

a vibration sensor configured to detect one or more vibrations at an access point of an enclosure; and an alarm system communicably engaged with the vibration sensor to receive one or more sensor inputs from the vibration sensor, wherein the alarm system comprises a local alarm for the access point of the enclosure, wherein the alarm system comprises a controller comprising at least one processor and a non-transitory computer-readable medium having instructions stored thereon that, when executed by the at least one processor, cause the at least one processor to perform one or more operations, the one or more operations comprising:

receiving the one or more sensor inputs from the vibration sensor in response to the vibration sensor detecting one or more vibrations at the access point of the enclosure;

analyzing the one or more sensor inputs to determine whether the one or more vibrations are atypical or exceed a pre-determined threshold, wherein determining whether the one or more vibrations are atypical or exceed the pre-determined threshold comprises analyzing a degree of variance between the one or more vibrations and one or more historical sensor inputs; and engaging the local alarm for the access point of the enclosure in response to determining the one or more vibrations are atypical or exceed the pre-determined threshold.

2. The early warning access detection system of claim 1 wherein the one or more operations of the at least one processor further comprise processing the one or more sensor inputs to determine at least one vibrational characteristic for the one or more vibrations.

3. The early warning access detection system of claim 1 wherein engaging the local alarm for the access point of the enclosure comprises communicating at least one notification signal to at least one client device or network server via a network communications interface.

4. The early warning access detection system of claim 1 further comprising an electronic access controller communicably engaged with the alarm system, wherein the electronic access controller is configured to electronically actuate at least one lock for selectively securing the access point of the enclosure.

5. The early warning access detection system of claim 4 wherein the one or more operations of the at least one processor further comprise communicating a notification signal to the electronic access controller in response to determining the one or more vibrations are atypical or exceed the pre-determined threshold.

6. The early warning access detection system of claim 5 wherein the electronic access controller is configured to revoke one or more access permissions or protocols for the at least one lock in response to receiving the notification signal.

7. An early warning access detection system comprising:

at least one environmental sensor configured to detect one or more environmental disturbances at an access point of an enclosure, wherein the at least one environmental sensor is selected from the group consisting of accelerometer, vibration sensor, Hall effect sensor, inductive sensor, humidity sensor, ambient light sensor, temperature sensor, and power outage sensor; and an alarm system communicably engaged with the at least one environmental sensor to receive one or more sensor inputs from the at least one environmental sensor, wherein the alarm system comprises a local alarm for the access point of the enclosure, wherein the alarm system comprises a controller comprising at least one processor and a non-transitory computer-readable medium having instructions stored thereon that, when executed by the at least one processor, cause the at least one processor to perform one or more operations, the one or more operations comprising:

receiving the one or more sensor inputs from the at least one environmental sensor in response to the at least one environmental sensor detecting the one or more environmental disturbances at the access point of an enclosure;

analyzing the one or more sensor inputs to determine whether the one or more environmental disturbances are atypical or exceed a pre-determined threshold, wherein determining whether the one or more environmental disturbances are atypical or exceed the pre-determined threshold comprises analyzing a degree of variance between the one or more sensor inputs and one or more historical sensor inputs; and engaging the local alarm for the access point of the enclosure in response to determining the one or more environmental disturbances are atypical or exceed the pre-determined threshold.

8. The early warning access detection system of claim 7 wherein the one or more operations of the at least one processor further comprise processing the one or more sensor inputs to determine at least one characteristic for the one or more environmental disturbances.

9. The early warning access detection system of claim 7 wherein the one or more environmental disturbances are selected from the group consisting of temperature fluctuations, vibrations, water inundation, humidity fluctuations, power fluctuations, and ambient light fluctuations.

10. The early warning access detection system of claim 7 further comprising an electronic access controller communicably engaged with the alarm system, wherein the electronic access controller is configured to electronically actuate at least one lock for selectively securing the access point of the enclosure.

11. The early warning access detection system of claim 10 wherein the one or more operations of the at least one processor further comprise communicating a notification signal to the electronic access controller in response to determining the one or more environmental disturbances are atypical or exceed the pre-determined threshold.

12. The early warning access detection system of claim 11 wherein the electronic access controller is configured to revoke one or more access permissions or protocols for the at least one lock in response to receiving the notification signal.

13. An early warning access detection method comprising:

detecting, with a vibration sensor, one or more vibrations at an access point of an enclosure;

receiving, with a controller of an alarm system, sensor input data from the vibration sensor in response to the vibration sensor detecting the one or more vibrations at the access point of the enclosure, wherein the controller of the alarm system is communicably engaged with the vibration sensor;

analyzing, with the controller of the alarm system, the sensor input data to determine whether the one or more vibrations are atypical or exceed a pre-determined threshold, wherein determining whether the one or more vibrations are atypical or exceed the pre-determined threshold comprises analyzing a degree of variance between the sensor input data and one or more historical sensor input data; and engaging, with the controller of the alarm system, a local alarm for the access point of the enclosure in response to determining the one or more vibrations are atypical or exceed the pre-determined threshold.

14. The early warning access detection method of claim 13 further comprising processing, with the controller of the alarm system, the sensor input data to determine at least one vibrational characteristic for the one or more vibrations.

15. The early warning access detection method of claim 13 further comprising communicating, with the controller of the alarm system, at least one notification signal to at least one client device or network server via a network communications interface.

16. The early warning access detection method of claim 13 further comprising suppressing, with the controller of the alarm system, the local alarm for the access point of the enclosure in response to determining the one or more vibrations are not atypical or do not exceed the pre-determined threshold.

17. The early warning access detection method of claim 15 further comprising revoking, with the at least one client device or network server, one or more access permissions or protocols for at least one electronic access control device in response to receiving the at least one notification signal from the controller of the alarm system.

18. The early warning access detection system of claim 1 wherein the one or more operations of the at least one processor further comprise storing sensor input data in at least one database in response to determining the one or more vibrations are not atypical or do not exceed the pre-determined threshold.

19. The early warning access detection system of claim 7 wherein the one or more operations of the at least one processor further comprise storing sensor input data in at least one database in response to determining the one or more vibrations are not atypical or do not exceed the pre-determined threshold.

20. The early warning access detection method of claim 13 further comprising storing the sensor input data in at least one database in response to determining the one or more vibrations are not atypical or do not exceed the pre-determined threshold.

* * * * *